Figure 3:
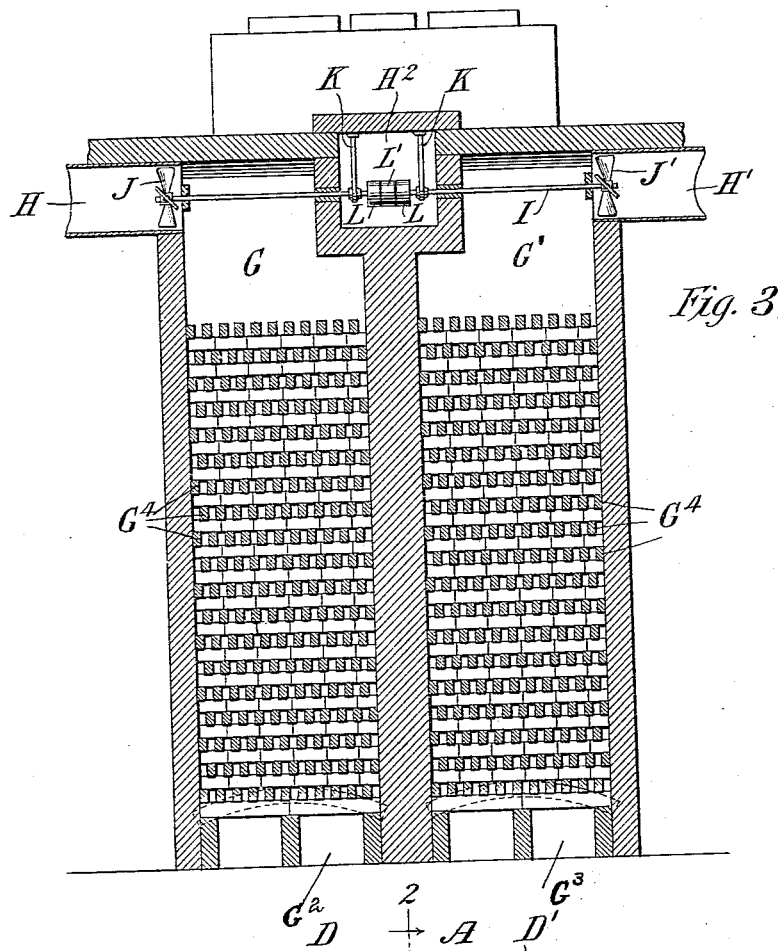

(No Model.) 3 Sheets—Sheet 1.
H. L. GANTT.
HIGH TEMPERATURE FURNACE.
No. 559,940. Patented May 12, 1896.
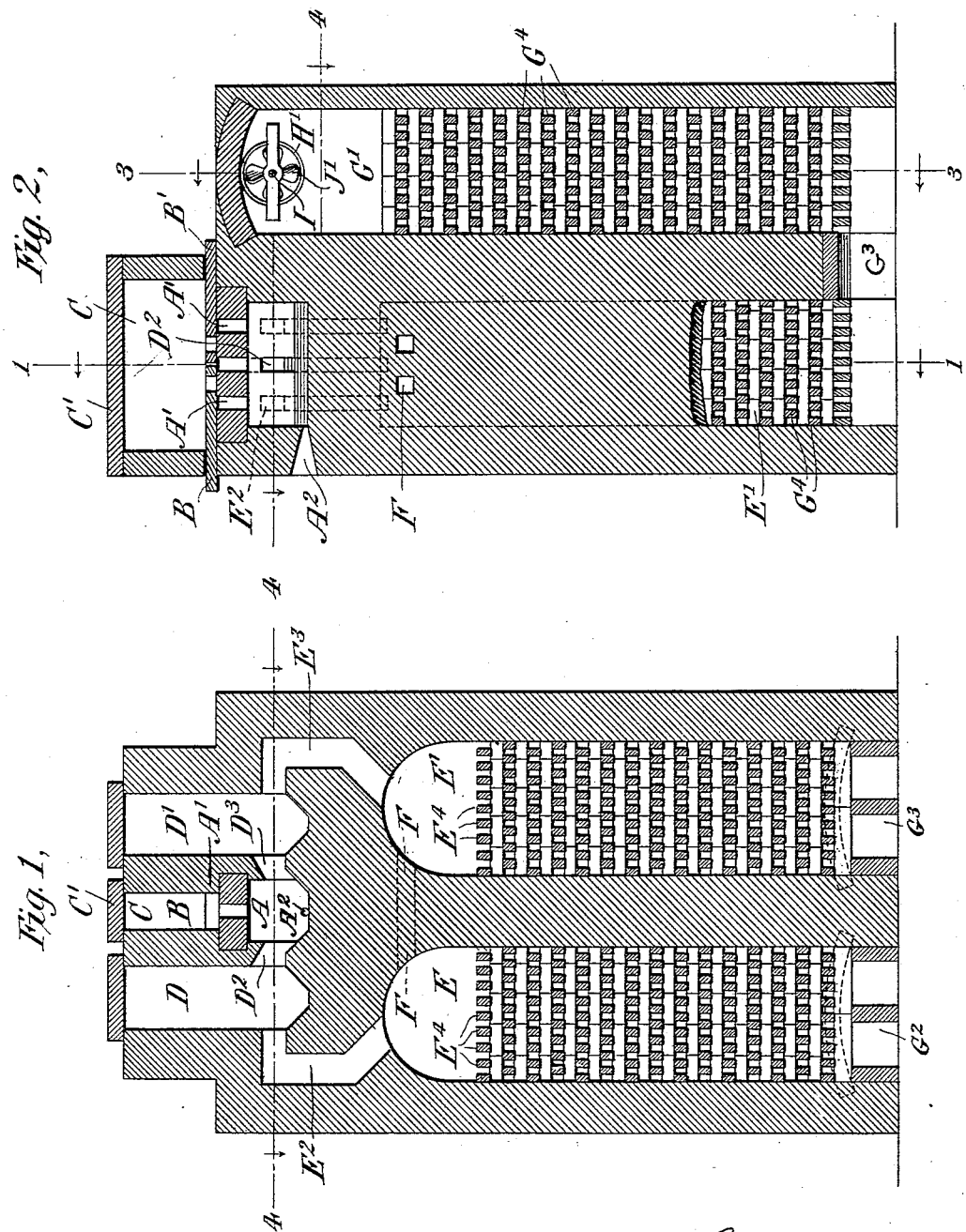
Witnesses
C. E. Ashley
H. W. Lloyd
Inventor
Henry L. Gantt
By his Attorneys
Baldwin, Davidson & Wight (No Model.) 3 Sheets—Sheet 2.

H. L. GANTT.
HIGH TEMPERATURE FURNACE.

No. 559,940. Patented May 12, 1896.

Witnesses
C. E. Ashley
H. W. Lloyd

Inventor
Henry L. Gantt
By his Attorneys
Baldwin, Davidson & Wight (No Model.) 3 Sheets—Sheet 3.
H. L. GANTT.
HIGH TEMPERATURE FURNACE.

No. 559,940. Patented May 12, 1896.

Witnesses
J. M. Withrow
Guy E. Davis

Inventor,
Henry L. Gantt,
By his Attorneys,
Baldwin Davidson Wight.

UNITED STATES PATENT OFFICE.

HENRY L. GANTT, OF CHESTER, PENNSYLVANIA.

HIGH-TEMPERATURE FURNACE.

SPECIFICATION forming part of Letters Patent No. 559,940, dated May 12, 1896.

Application filed August 2, 1895. Serial No. 558,016. (No model.)

*To all whom it may concern:*

Be it known that I, HENRY L. GANTT, a citizen of the United States, residing at Chester, in the county of Delaware, in the State of Pennsylvania, have invented certain new and useful Improvements in High-Temperature Furnaces, of which the following is a specification.

This invention relates to the production of high temperatures and high temperatures that will produce reducing effects on the material treated.

The invention involves a new method of operation as well as an improved furnace of the regenerative class by which very high temperatures may be obtained from the use of solid fuel. The method consists in first causing a solid carbon fuel to be burned to produce carbonic oxid, (CO,) then causing the carbonic oxid to be burned to carbonic acid, ($CO_2$,) and by means of the high temperature produced thereby heating the air supplied to the fuel to burn it to carbonic oxid, (CO,) and the air supplied to the carbonic oxid (CO) to burn it to carbonic acid ($CO_2$) by the regenerative action of the heat due to the complete conversion of carbon to carbonic acid, ($CO_2$,) the carbonic oxid (CO) from the primary burning of the fuel being caused to act directly on the material to be treated where reducing effects are desired. The heat being produced by this method by reverse cycles of regenerative operations is accumulated and is consequently very intense. The furnace devised by me to carry out this method of producing high temperature has two regenerator-chambers connected by flues or passages to the solid-fuel chamber or chambers, which communicate with or constitute the hearth or hearths where the material is treated, the adjacent ends of the regenerator-chambers nearest to the combustion and treating chambers being connected together by flues or openings, by means of which the air, which is highly heated as it passes alternately through each regenerator-chamber, is allowed partly to flow into the other regenerator-chamber, and there in its highly-heated condition combines with the gas from the fuel to complete the combustion of the same. In the preferred form of furnace and that shown in the drawings, which I will now refer to, the treating-hearth is located between two solid-fuel chambers, and said hearth and fuel-chambers are located on the tops of the regenerator-chambers. Heating-chambers as auxiliary to the regenerator-chambers, and means for forcing and reversing the air through the furnace, are also shown.

Figure 4:
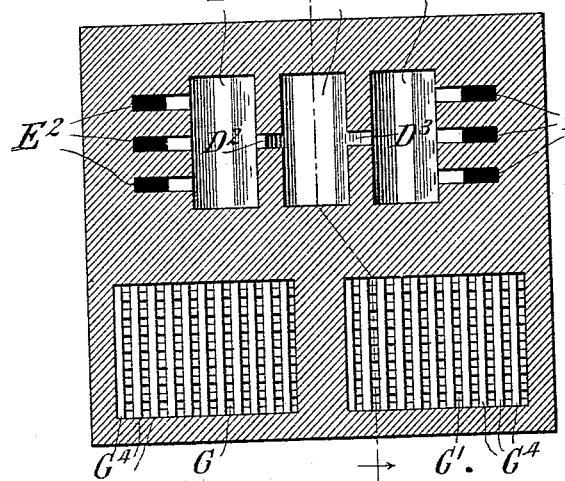
Figure 5:
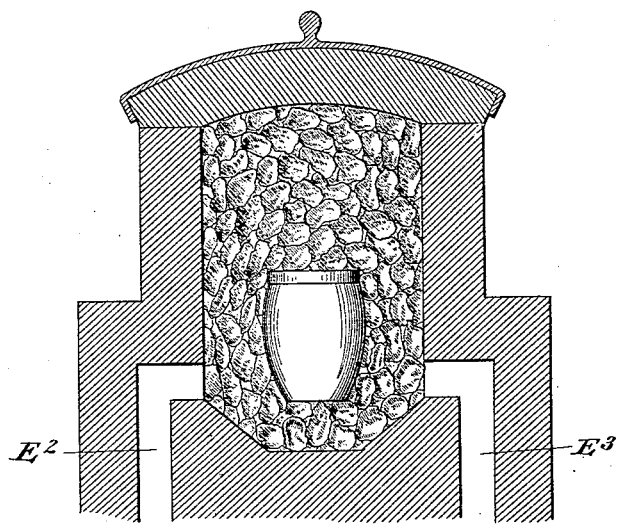

Figure 1 is a vertical section of my improved furnace on the line 1 1, Fig. 2. Fig. 2 is a vertical section on the line 2 2, Fig. 4. Fig. 3 is a vertical section on the line 3 3, Fig. 2. Fig. 4 is a vertical section on the line 4 4, Figs. 1 and 2; and Fig. 5 is a sectional view similar to the upper part of Fig. 1, showing a slight modification in construction.

The hearth A or chamber to contain the material to be treated is located in the central upper part of the furnace. Its roof is provided with openings $A'$ $A'$, covered by the slides B $B'$, which are perforated to afford access to the hearth for the admission of the material thereto when the slides are pulled out, said perforations being over solid parts of the roof when the slides are closed, as shown. The material is passed down the chamber C to the hearth and this chamber is covered by the cap $C'$ and the material is removed from the hearth through the opening $A^2$.

At the sides of the hearth A are located the solid-fuel chambers D and $D'$, and these have communication with the hearth through the flues $D^2$ $D^3$, and with the two regenerator-chambers E and $E'$ through the flues $E^2$ and $E^3$. These regenerator-chambers are located beneath the fuel-chambers D and $D'$ and are filled, with the exception of space at their upper ends, with checkerwork or bricks $E^4$, arranged in the usual manner of heat-regenerative devices to absorb and give up the heat of the products of combustion.

The upper ends of the two chambers E $E'$ have communication with each other through the flues or openings F F, and their lower ends are open to the lower ends of the chambers G $G'$, respectively, through the holes $G^2$ $G^3$ in the dividing wall. These chambers G and $G'$ are filled to within a short distance of their upper ends with checkerwork or bricks $G^4$, and in their outer walls, oppositely arranged, are the flues or openings H $H'$, and between them is formed the recess $H^2$. A shaft I extends across the upper ends of the chambers G G' through the recess H² and into the flues H H', and on the ends of this shaft, in flues H H', are secured the fans or blowers J J', which are so made as to cause currents to flow in the same direction when the shaft is rotated. The central part of the shaft I is supported in hanger-bearings K K, and between these bearings are the pulleys L L L', the outer ones L L being loose on the shaft and the central one L' keyed or otherwise secured thereto. These pulleys are adapted to carry driving-belts, one straight and the other crossed, arranged and controlled by shifters in such manner that the shaft may be rotated in the two directions, as desired, in the ordinary and well-known way.

The operation of the furnace is as follows: A fire of coke, anthracite coal, or other solid carbon fuel is started in one of the fuel-chambers, say D'. The fans are rotated so as to force the air through chamber G', regenerator-chamber E', to chamber D', exhausting from the chamber D' through hearth A, fuel-chamber D, regenerator-chamber E, and chamber G. The fuel in D' is thus burned to carbonic oxid, which passes through hearth A, fuel-chamber D, to chamber E, where said carbonic oxid is burned to carbonic acid by the air which passes from the chamber E' through the flues F. The products of combustion being now at a high temperature imparts most of the heat to the checker-bricks in G, the checker-bricks in G' being also heated as the gases pass through the said chamber to be discharged at its upper end. After running the furnace in this manner for some time the direction of rotation of the fans is reversed, the air being now forced down through the chamber G, where it is heated, up through the chamber E, where it becomes highly heated by passing over the checker-bricks in this chamber, which are very hot, into the fuel-chamber D, which is also supplied with fuel and which fuel is burned to carbonic oxid at a very high temperature, and passes through the hearth, acting on the material therein, from whence it passes through D' to chamber E'. Said carbonic oxid here meeting with the highly-heated air coming from the chamber E through the flues F F is burned at a very high temperature to carbonic acid, which gives up most of its heat to the checker-brick in E' and the greater part of the remainder of its heat to the bricks in chamber G' before finally escaping therefrom. After running in this way for some time the currents of air and gases are again reversed, passing through the furnace as first described, and these reversals are caused to occur at suitable intervals, the resulting effect being a very high temperature, and it will be observed that as nothing but highly-heated carbonic oxid passes into the hearth a powerful reducing action is had on the material there being treated. Of course the temperature of the furnace and the amount of combustion in the regenerator-chambers will be governed and determined by the amount of air admitted from one regeneration to another through the passage or passages F F.

In Fig. 5 I have shown a slight modification of the construction already described—that is to say, in this figure there is but a single chamber, to the opposite sides of which the flues E² E³ respectively lead. This chamber is provided with a suitable cover. The material to be treated may be mixed with the fuel in this chamber, or, as shown, the material may be placed in a crucible surrounded by the fuel in the chamber.

All parts of the furnace submitted to the highly-heated gases and air will be preferably formed or lined with magnesite bricks or fire-clay.

In my improved organization and method of operation the regenerator-chambers are respectively what are known as "single-surface" regenerators—that is to say, the highly-heated gases or products of combustion pass out directly through the same regenerator-chamber through which the incoming air to be preheated passes.

I claim as my invention—

1. The improved method of operating regenerative furnaces, which consists in supplying heated air to a solid carbon fuel to burn it to carbonic oxid, (CO,) causing the carbonic oxid to act directly on the material to be reduced, then supplying air to the carbonic oxid to burn it to carbonic acid ($CO_2$), thereby developing a high heat, extracting and storing such heat, and then causing the air which is supplied to the fuel to burn it to carbonic oxid and the air which is supplied to the carbonic oxid to burn it to carbonic acid to take up such stored heat, such operation being continued or repeated, substantially as and for the purpose set forth.

2. In a regenerative furnace, the combination of a chamber adapted to hold a solid fuel, two single-surface regenerator-chambers connected at their inner ends by a passage of which the fuel-chamber forms a part, through each of which regenerator-chambers the products of combustion alternately pass out and the incoming air to be heated alternately passes into the fuel-chamber, means for reversing the operation of the furnace, a passage connecting said two regenerator-chambers at a point between the fuel-chamber and their outer ends, whereby a part of the incoming heated air passing in through one of said regenerator-chambers on the way to the fuel-chamber is diverted into the other regenerator-chamber (through the passage connecting them) to complete therein the combustion of the gases from the fuel-chamber passing out therethrough, substantially as set forth.

3. In a high-temperature furnace, the combination of two chambers adapted to hold solid fuel, a hearth located between these chambers and connected therewith by flues, two regenerator-chambers, each connected by passages or flues to one of the fuel-chambers, a passage or flue connecting the regenerator-chambers together, and means for reversing the direction of air through the regenerator-chambers, the fuel-chambers and the hearth.

4. In a high-temperature furnace, the combination of two chambers adapted to hold solid fuel, a hearth located between these chambers and connected therewith by flues, two regenerator-chambers, each connected by passages or flues to one of the fuel-chambers, a passage or flue connecting the regenerator-chambers together, two heating-chambers containing checker-bricks connected at their lower ends to the lower ends of the regenerator-chambers, and fans or blowers located at the upper parts of these heating-chambers, operated as described to alternately force air through and exhaust from these chambers and the other parts of the furnace.

5. A regenerative furnace, comprising the combination of a chamber for the combustion of fuel, two single-surface regenerator-chambers connected at their inner ends by a passage of which such combustion-chamber forms a part, and also connected by a passage, for the admission of air from one to the other, at a point between the combustion-chamber and their outer ends, and means for reversing the operation of the furnace, whereby a part of the heated air passing in through one of said regenerator-chambers on the way to the combustion-chamber is diverted into the other regenerator-chamber to complete therein the combustion of the gases passing therethrough from the combustion-chamber.

In testimony whereof I have hereunto subscribed my name.

HENRY L. GANTT.

Witnesses:
CHARLES PALMER,
SIDNEY S. EMERY.